Reissued Mar. 9, 1943

Re. 22,287

UNITED STATES PATENT OFFICE 22,287

WATER-SOLUBLE AZO DYES FROM AMINO-ARYLOXY-ACYL-DIAMINES

Chiles E. Sparks, Wilmington, and James W. Libby, Jr., Claymont, Del., assignors to E. I. du Pont de Nemours & Company, Wilmington, Del., a corporation of Delaware No Drawing. Original No. 2,266,823, dated December 23, 1941, Serial No. 345,171, July 12, 1940. Application for reissue July 7, 1942, Serial No. 450,001

17 Claims. (Cl. 260—145)

This invention relates to new direct tetrakisazo dyes and especially to such dyes in which the first components are a class of amino-aryloxy-acyl-diamines, to improved dyeings produced by the new compounds and to methods of manufacturing.

Direct dyes are those which dye the cloth directly from a water bath without subsequent treatment. These colors, numerous examples of which are recorded in the literature, are very useful because they are substantive to cellulose and possess bright shades which are moderately fast to light. These products are very fugitive to washing. The dyeings show considerable loss in strength when washed and they impart an undesirable stain in washing to associated uncolored or differently colored fibers. It is therefore desirable to provide direct colors which possess good washing fastness and do not stain other associated fibers.

Heretofore poor washing fastness has been improved in the so-called diazo colors by providing substantive diazotizable colors, diazotizing the direct colors on the fiber and then developing with suitable coupling components. These diazo colors are faster to washing but duller in shade than the corresponding direct colors. Among the objections to developed diazo colors are the considerable shade change which usually results on development and the relatively high expense for materials and processing to be borne by the dyer who must carry out the development.

It is among the objects of this invention to provide azo dyes which combine the advantages of simplicity of application and freedom from shade change upon dyeing of the direct colors with the washing fastness of the diazo colors. Another object of the invention is to provide direct dyeings which are capable of being after-treated by simple procedures. Another object of the invention is to provide dyes which will show little if any shade change by such after-treatment. Another object is to provide dyeings having washing fastness equal to or surpassing that of diazo colors. Another object of the invention is to provide methods of applying the colors and of increasing their light fastness. Still other objects of the invention will be apparent from the following description.

The objects of the invention are attained in general by providing the type of tetrakisazo compound hereinafter to be described, making direct dyeings and thereafter appropriately treating the direct dyeings with formaldehyde to form a formaldehyde complex on the fiber.

The new compounds are represented in general by the formula

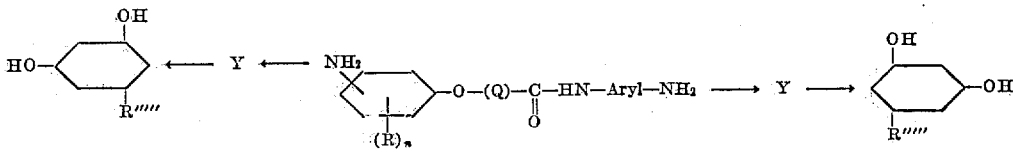

in which Q is the radical of a straight or branched chain aliphatic hydrocarbon compound having 1 to 6 carbons; R''''' is one of a group consisting of hydrogen, alkyl having 1 to 6 carbons, the corresponding alkoxy groups, hydroxy, sulfonic acid and carboxy; R is from the group consisting of hydrogen, alkyl having 1 to 6 carbons, the corresponding alkoxy groups, halogen, carboxy, and sulfonic acid; $n$ is 1 to 2; —HN—Aryl—$NH_2$ is a radical from the benzene and naphthalene series represented by the formulae

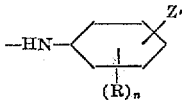

and

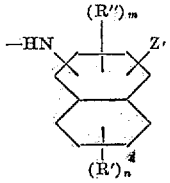

in which R' is from the group consisting of hydrogen, halogen, carboxy and sulfonic acid; R'' is from the group consisting of hydrogen, halogen, alkyl having 1 to 6 carbons and the corresponding alkoxy groups; $m$ is 1 to 2; and Z is one of a group consisting of amino and the radical

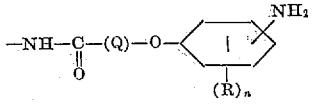

The Y compounds of the above general formula are amine substituted coupling components of the benzene and naphthalene series represented by the following formulae

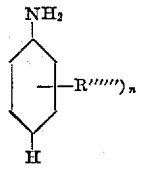

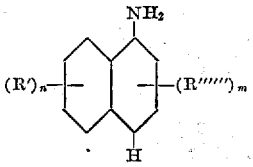

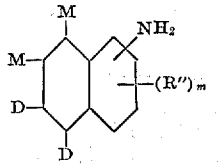

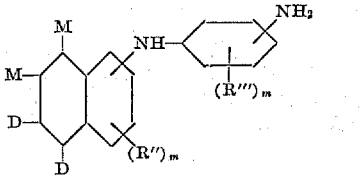

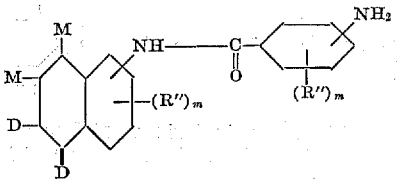

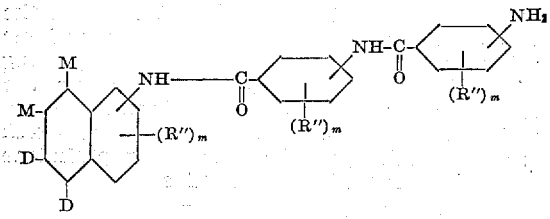

and

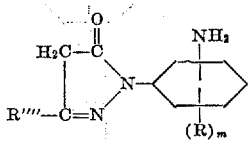

in which one D is hydroxy and the other is hydrogen; the M which is meta to hydroxy is sulfonic acid and the other M is hydrogen; R''' is from the group consisting of hydrogen, carboxy and sulfonic acid; R'''' is one of a group consisting of methyl and carboxy; R''''' is one of a group consisting of hydrogen, alkyl and alkoxy. The compounds of the invention must contain at least one solubilizing group, such as carboxy and sulfonic acid but more than one solubilizing group can be present.

These compounds can be made in general by tetrazotizing the described amino-aryloxy-acyldiamine and coupling with two molecular equivalents of the compound Y, thus forming a disazo compound having two primary arylamine groups. The disazo compound is tetrazotized and coupled with two molecular equivalents of a compound of the described dihydroxy benzene series. In the form of any of their alkali metal salts, the compounds are soluble in water and dyeings can be made from such solutions. For exceptionally good washing fastness, the dyeings are treated with formaldehyde in a suitable manner. If desired, the direct or the formaldehyde treated dyeings can be treated with metal salt solutions which gives deeper shades with improvement in light fastness.

These compounds are valuable as direct dyes for cellulosic materials, such as cotton, regenerated cellulose rayon and similar dyeable substances. They produce dyeings in bright shades. Superior washing fastness without loss of brightness or marked change of shade is attained by after-treating the dyeings with formaldehyde, thus providing a class of dyes which give dyeings in bright shades having superior washing fastness, good discharge properties and other properties desired in dyeings, and dyes which can be operated to make dyeings by simple and economical methods.

This invention will be more fully set forth in the following more detailed description which includes examples that are given as illustrative embodiments of the invention and not as limitations thereof. Parts are expressed in parts by weight unless otherwise noted.

*Example I*

A slurry containing 12.9 parts of 3-(4'-aminophenoxy-acetylamino)-1-amino-benzene in 300 parts of water was acidified with 9.1 parts of hydrochloric acid and stirred to a complete solution. The solution was cooled to 0° C. by adding ice and then tetrazotized by adding 6.9 parts of sodium nitrite with good agitation. The temperature was held at 0–5° C. for one-half hour and a distinct test for excess nitrite was maintained to complete the tetrazotization.

A solution was made by dissolving 25.2 parts of 2-amino-5-naphthol-7-sulfonic acid in a water solution of soda ash containing 400 parts of water and 5.7 parts of soda ash. This solution was cooled to 0° C., 31.8 parts of soda ash were dissolved in the solution and the solution of the tetrazo was slowly added whilst maintaining the temperature at 0–5° C. The mixture was then stirred one hour after all the tetrazo had been added.

The product of coupling was isolated by heating to 60°–65° C., slowly salting to 5% of the volume, stirring one-half hour longer and filtering.

The press cake was slurried with 700 parts of water, and 13.8 parts of hydrochloric acid were added. The mixture was cooled to 5° C. and tetrazotized by adding 6.9 parts of sodium nitrite and maintaining a strong test for excess nitrite and a temperature of 5°–10° C. for one hour.

A solution composed of 16.5 parts of resorcinol and 150 parts of water was cooled to 0° C. by adding about 100 parts of ice and 37 parts of soda ash were added.

The tetrazo slurry was slowly run into the solution of resorcinol whilst maintaining good agitation and a temperature of 0–5° C. and then the mixture was stirred one hour after the tetrazo had all been added. The product was isolated by heating the slurry to 60°–65° C., salting slowly to 5% on the volume, filtering and drying in an oven at 75° C. The dry powder had a red-brown appearance.

The dye is represented by the formula

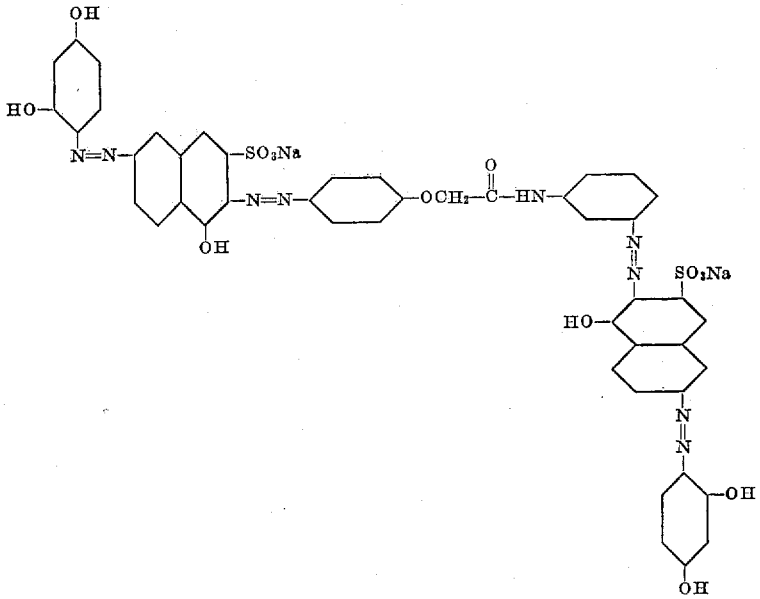

When dyed on cotton or regenerated cellulose fibers and treated with formaldehyde as hereinafter described, the dyeing was a bordeaux shade having excellent fastness to washing and good discharge properties.

The fibers were dyed and after-treated as follows: A dyebath was made by dissolving 0.3 g. of the product in 100 cc. of water at 190°–200° F., adding 0.2 g. of sodium carbonate to assist the solution. The bath was diluted with stirring to a total volume of 500 cc. with water at approximately 160° F. and 40 cc. of a 10% solution of Glauber's salt were added. A 10 g. piece of regenerated cellulose rayon was wet out with water, squeezed partially dry and entered into the dye bath. The temperature of the dye bath was then raised to 180°–190° F. in the course of fifteen minutes and the piece was held in the bath at that temperature for one hour with stirring at frequent intervals. At the end of one hour, the dyeing was removed and rinsed in cold water.

The after-treatment may be done in a fresh bath as follows:

The rinsed dyeing from the above operation was entered into 500 cc. of water at 130°–140° F. and 10 cc. of 10% formaldehyde (25 cc. of approximately 37% formaldehyde by weight diluted to 250 cc. with water) were added. The dyeing was held in the bath at this temperature for twenty minutes and then removed, rinsed and dried.

The after-treatment may also be done in the dye bath. This is the preferred procedure because of its economy and ease of application. It is carried out as follows: At the end of the dyeing period and without removing the dyeing, 10 cc. of 10% formaldehyde are added to the dye bath and the bath is maintained at about 130°–140° F. for about 20 minutes. After twenty minutes or for such other time as is necessary to form a formaldehyde complex with the dye, it is rinsed and dried.

*Example II*

By following the procedure of Example I, except substituting 41.7 parts of 2-(4′-amino-3′-sulfo-phenylamino)-5-naphthol-7-sulfonic acid for 25.2 parts of 2-amino-5-naphthol-7-sulfonic acid, another product was made.

The dried product was dark brown in appearance. When dyed on regenerated cellulose rayon from a water bath and after-treated with formaldehyde as directed in Example I, the dyeing was a rubine shade possessing excellent washing fastness and good discharge properties.

The dye is represented by the formula

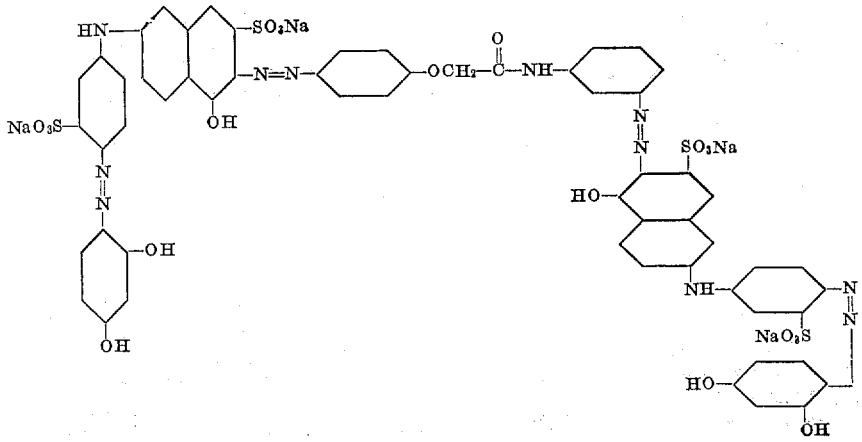

*Example III*

By following the procedure of Example I and substituting for 12.9 parts of 3-(4'-amino-phenoxy - acetylamino)-1-amino - benzene, 12.9 parts of 4-(4'-amino-phenoxy-acetylamino)-1-amino-benzene, and for 25.2 parts of 2-amino-5-naphthol-7-sulfonic acid, 37.7 parts of 2-(3'-amino - benzoyl - amino)-5-naphthol-7-sulfonic acid, another product was made.

The dry powder was red-brown in appearance. When dyed on regenerated cellulose rayon and after-treated with formaldehyde as directed in Example I, the dyeing was scarlet having excellent washing fastness and good discharge properties.

The dye is represented by the formula

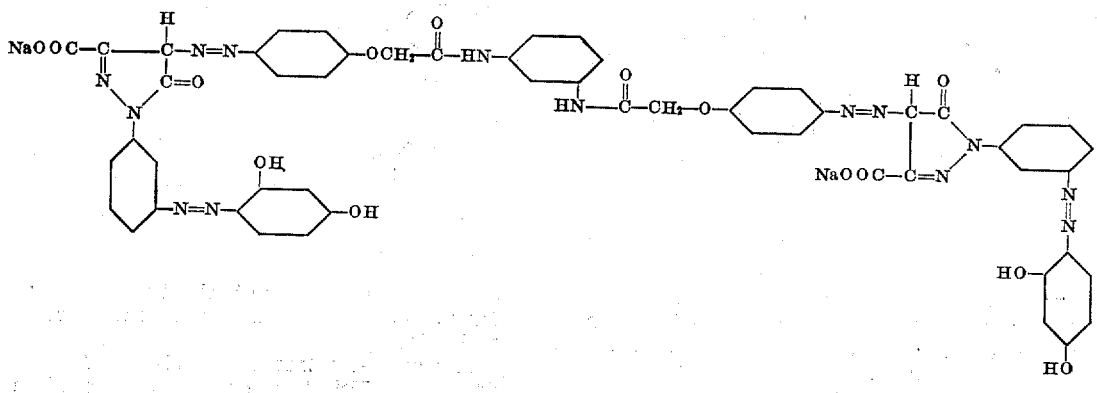

benzene and for 25.2 parts of 2-amino-5-naphthol-7-sulfonic acid, 23.1 parts of 1-(3'-amino-phenyl)-5-pyrazolone-3-carboxylic acid another dye was made.

The dry powder was a yellow brown in appearance. When dyed on regenerated cellulose rayon from a water bath and after-treated with formaldehyde as directed in Example I, the dyeing was an orange shade and had excellent fastness and good discharge properties.

The dye is represented by the formula:

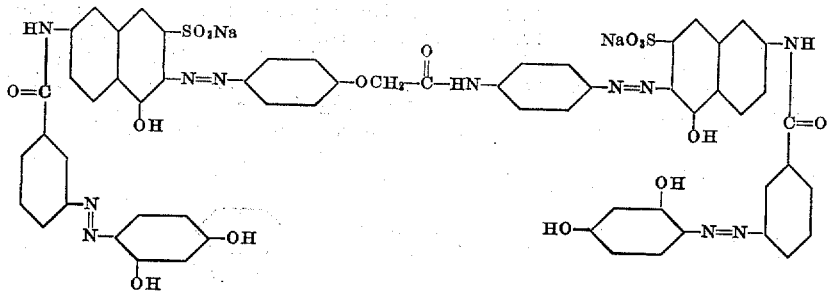

In the following table other modifications of the invention are set forth. The products given in the table were prepared by methods similar to those described in the preceding examples. The dyeings produced with these compounds on regenerated cellulose rayon had properties similar to those of the preceding examples. Arrows point from the compounds which were tetrazotized and toward the coupling components, it being understood that the couplings were made in the order stated and the shade is that of the formaldehyde after-treated dyeing.

*Example IV*

By following the procedure of Example I and substituting for 12.9 parts of 3-(4'-amino-phenoxy - acetylamino)-1-amino - benzene, 20.3 parts of 1,3-di(4'-amino-phenoxy-acetylamino)-

*Table*

| Example | Combination | Shade |
|---|---|---|
| V | 4-(4′-amino-phenoxy-acetylamino)-1-amino-benzene ⟹ (1-(3′-amino-phenyl)-5-pyrazolone-3-carboxylic acid)$_2$ ⟹ (1-3-dihydroxy-benzene)$_2$. | Orange. |
| VI | 4-(4′-amino-phenoxy-acetylamino)-1-amino-benzene ⟹ (2-(4′-amino-3′-sulfo-phenylamino)-5-naphthol-7-sulfonic acid)$_2$ ⟹ (1-3-dihydroxy-benzene)$_2$. | Maroon. |
| VII | 3-(4′-amino-phenoxy-acetylamino)-1-amino-benzene ⟹ (1-(3′-amino-phenyl)-5-pyrazolone-3-carboxylic acid)$_2$ ⟹ (1-3-dihydroxy-benzene)$_2$. | Orange. |
| VIII | 3-(4′-amino-phenoxy-acetylamino)-1-amino-benzene ⟹ (2-(4′-amino-3 -sulfo-phenylamino)-5-naphthol-7-sulfonic acid)$_2$ ⟹ (1-3-dihydroxy-benzene)$_2$. | Violet. |
| IX | 4-(4′-amino-phenoxy-acetylamino)-1-amino-naphthalene ⟹ (1-(3′-amino-phenyl)-5-pyrazolone-3-carboxylic acid)$_2$ ⟹ (1-3-dihydroxy-benzene)$_2$. | Orange. |
| X | 4-(4′-amino-phenoxy-acetylamino)-1-amino-naphthalene ⟹ (2-(4′-amino-3′-sulfo-phenyl-amino)-5-naphthol-7-sulfonic acid)$_2$ ⟹ (1-3-dihydroxy-benzene)$_2$. | Violet. |
| XI | 1,3-di-(4′-amino-phenoxy-acetylamino)-benzene ⟹ (1-(3′-amino-phenyl)-5-pyrazolone-3-carboxylic acid)$_2$ ⟹ (1-3-dihydroxy-benzene)$_2$. | Orange. |
| XII | 1,3-di-(4-(4′-amino-phenoxy-acetylamino)-benzene ⟹ (2-(4′-amino-3′-sulfo-phenylamino)-5-naphthol-7-sulfonic acid)$_2$ ⟹ (1-3-dihydroxy-benzene)$_2$. | Rubine. |
| XIII | 1-4-di-(4′-amino-phenoxy-acetylamino)-naphthalene-6-sulfonic acid ⟹ (2-(3′-amino-benzoylamino)-5-naphthol-7-sulfonic acid)$_2$ ⟹ (1-3-dihydroxy-benzene)$_2$. | Red-brown. |
| XIV | 1-4-di-(4′-amino-phenoxy-acetylamino)-naphthalene-6-sulfonic acid ⟹ (2-amino-5-naphthol-7-sulfonic acid)$_2$ ⟹ (1-3-dihydroxy benzene)$_2$. | Rubine. |
| XV | 1-3-di-(4′-amino-phenoxy-acetylamino)-benzene-5-sulfonic acid ⟹ (1-(3′-amino-phenyl)-5-pyrazolone-3-carboxylic acid)$_2$ ⟹ (1-3-dihydroxy-benzene)$_2$. | Orange. |
| XVI | 1-3-di-(4′-amino-phenoxy-acetylamino)-benzene-5-sulfonic acid ⟹ (2-(4′-amino-3′-sulfo-phenylamino)-5-naphthol-7-sulfonic acid)$_2$ ⟹ (1-3-dihydroxy-benzene)$_2$. | Rubine. |
| XVII | 1-3-di-(4′-amino-phenoxy-acetylamino)-benzene-5-sulfonic acid ⟹ (2-(3′-amino-benzoylamino)-5-naphthol-7-sulfonic acid)$_2$ ⟹ (1-3-dihydroxy-benzene)$_2$. | Scarlet. |
| XVIII | 1-3-di-(4′-amino-phenoxy-acetylamino)-benzene-5-sulfonic acid ⟹ (2-amino-5-naphthol-7-sulfonic acid)$_2$ ⟹ (1-3-dihydroxy-benzene)$_2$. | Bordeaux. |
| XIX | 1-3-di-(4′-amino-phenoxy-acetylamino)-benzene-5-sulfonic acid ⟹ (1-amino-5-naphthol-7-sulfonic acid)$_2$ ⟹ (1-3-dihydroxy-benzene)$_2$. | Red-brown. |
| XX | 4-(4′-amino-phenoxy-acetylamino)-1-amino-benzene ⟹ (2-(3′-amino-benzoylamino)-5-naphthol-7-sulfonic acid)$_2$ ⟹ (1-3-dihydroxy benzene)$_2$. | Scarlet. |
| XXI | 4-(4′-amino-phenoxy-acetylamino)-1-amino-benzene ⟹ (1-amino-5-naphthol-7-sulfonic acid)$_2$ ⟹ (1-3-dihydroxy-benzene)$_2$. | Red-brown. |
| XXII | 4-(4′-amino-phenoxy-acetylamino)-1-amino-benzene ⟹ (2-amino-5-naphthol-7-sulfonic acid)$_2$ ⟹ (1-3-dihydroxy-benzene)$_2$. | Maroon. |
| XXIII | 3-(4′-amino-phenoxy-acetylamino)-1-amino-benzene ⟹ (2-(3 -amino-benzoylamino)-5-naphthol-7-sulfonic acid)$_2$ ⟹ (1-3-dihydroxy-benzene)$_2$. | Scarlet. |
| XXIV | 3-(4′-amino-phenoxy-acetylamino)-1-amino-benzene ⟹ (1-amino-5-naphthol-7-sulfonic acid)$_2$ ⟹ (1-3-dihydroxy-benzene)$_2$. | Red-brown. |
| XXV | 3-(4′-amino-phenoxy-acetylamino)-1-amino-benzene ⟹ (2-amino-5-naphthol-7-sulfonic acid)$_2$ ⟹ (1-3-dihydroxy-benzene)$_2$. | Bordeaux. |
| XXVI | 4-(4′-amino-phenoxy-acetylamino)-1-amino-naphthalene ⟹ (2-(3′-amino-benzoylamino)-5-naphthol-7-sulfonic acid)$_2$ ⟹ (1-3-dihydroxy-benzene)$_2$. | Red-brown. |
| XXVII | 4-(4′-amino-phenoxy-acetylamino)-1-amino-naphthalene ⟹ (1-amino-5-naphthol-7-sulfonic acid)$_2$ ⟹ (1-3-dihydroxy-benzene)$_2$. | Chocolate brown. |
| XXVIII | 4-(4′-amino-phenoxy-acetylamino)-1-amino-naphthalene ⟹ (2-amino-5-naphthol-7-sulfonic acid)$_2$ ⟹ (1-3-dihydroxy-benzene)$_2$. | Blue chocolate brown. |
| XXIX | 1-3-di-(4′-amino-phenoxy-acetylamino)-benzene ⟹ (2-(3′-amino-benzoylamino)-5-naphthol-7-sulfonic acid)$_2$ ⟹ (1-3-dihydroxy-benzene)$_2$. | Scarlet. |
| XXX | 1-3-di-(4′-amino-phenoxy-acetylamino)-benzene ⟹ (2-amino-5-naphthol-7-sulfonic acid)$_2$ ⟹ (1-3-dihydroxy-benzene)$_2$. | Maroon. |
| XXXI | 1-3-di-(4′-amino-phenoxy-acetylamino)-benzene ⟹ (1-amino-5-naphthol-7-sulfonic acid)$_2$ ⟹ (1-3-dihydroxy-benzene)$_2$. | Red. |

The treated dyeings which are made in accordance with the invention have better washing fastness than dyeings made with direct colors. The washing fastness is as good as dyeings made from diazo or developed colors and in some cases better. The initial dyeings do not change shade markedly when treated with formaldehyde as do the diazo colors upon development. Accordingly, the invention provides for dyeings having excellent washing fastness together with brightness as well as good discharge properties and other properties which are desirable and valuable in dyed fabrics. Superior dyeings are more economical to produce with the compounds of the invention than with diazo colors. This is due in part to the fact that the dyeing operations are simpler, a smaller number of operations is required and the operations are more easily controlled.

Minor variations in the processes of coupling known to those who are skilled in the art can be made. Likewise variations in the concentration, temperature and duration of the after-treating processes can be made to suit special circumstances. Any alkali-metal salts can be used instead of the sodium salts and any of the halogen derivatives can be used instead of the chloro derivatives in making the compounds.

Resorcinol is the preferred end component of this class. There are various modifications of the invention which give dyeings having an exceptionally good balance of the improved properties. Such modifications are those in which the Y components are amino naphthol sulfonic acid and the hereinbefore indicated derivatives thereof and the amino-phenyl-pyrazolones and their derivatives; and the X components are represented by the formula

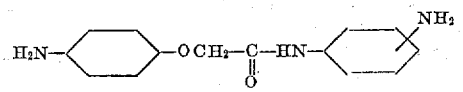

As other illustrations of the many X components which can be used to make products having the general properties of those hereinbefore described are 4-(3′-amino - phenoxy - acetylamino)-1-aminobenzene,
3-[alpha-(4′-amino-2′-methoxy - phenoxy)-propionylamino]-1-amino benzene,
4-[alpha -(5′- amino - 2′ - methyl - phenoxy)-butyrylamino]-1-aminobenzene,
4-(4′-amino - phenoxy - acetylamino)-1-aminonaphthalene,
1,4-di-(3′-amino - phenoxy-acetylamino)-naphthalene-7-sulfonic acid,
3-(4′-amino-2′-chloro-phenoxy - acetylamino)-1-aminobenzene,
3-[alpha(2′-methyl -4′- amino - phenoxy - propionyl - amino)]-1-amino - benzene-3-sulfonic acid,
3-[beta-(2′-sulfo-4′-amino-phenoxy - propionylamino)]-1-amino-benzene,
4-[gamma -(2′- carboxy -4′- amino - phenoxybutyrlamino)]-1-amino-benzene, 4-[alpha-(3'-chloro-4'-amino-phenoxy-caproyl-amino)]-1-amino-2,5-dimethoxy-benzene,
1,3-di(2'-chloro-4'-amino-5'-methyl-phenoxy-acetylamino)-benzene,
1-(4'-amino-phenoxy-acetylamino)-2-methoxy-4-amino-naphthalene-6-sulfonic acid,

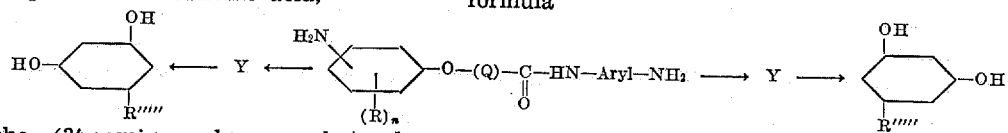

1,4-di[alpha-(3'-amino-phenoxy-butyryl-amino)]-naphthalene-5-carboxylic acid,
1-(4'-amino-phenoxy-acetylamino)-4-amino-5-methoxy-naphthalene-7-sulfonic acid,
2-(3'-amino-phenoxy-acetylamino)-4-amino-naphthalene-6-sulfonic acid,
1-(4'-amino-phenoxy-acetylamio)-4-amino-8-chloro-naphthalene-6-carboxylic acid,
1-(3'amino-6'-methyl-phenoxy-acetylamino)-3-amino-benzene-5-carboxylic acid,
1-[alpha-(4'-amino-phenoxy-acetylamino)]-4-amino-2,5-dichloro-benzene, and
1-(2'-amino-phenoxy-acetylamino)-3-amino-benzene.

As illustrations of other variations of the Y components are mentioned aniline, 1-amino-2-methoxy-5-methyl-benzene, 1-amino-3-methyl-benzene, 1-amino-naphthalene-6-sulfonic acid, 2-amino-8-naphthol-6-sulfonic acid, 2-amino-8-naphthol-3,6-disulfonic acid, 1-(4'-amino-3'-sulfo-phenylamino)-5-naphthol-7-sulfonic acid, 1-(3'-amino-benzoylamino)-5-naphthol-7-sulfonic acid, 1-amino-2-methoxy-naphthalene-6-sulfonic acid, 1-amino-8-chloro-naphthalene-6-sulfonic acid, 1-amino-naphthalene-6-carboxylic acid, 2-amino-3-methyl-5-naphthol-7-sulfonic acid, 2-(4'-amino-3'-methyl-5'-sulfo-phenylamino)-5-naphthol-7-sulfonic acid, 2-(3'-amino-5'-sulfo-phenylamino)-5-naphthol-7-sulfonic acid, 2-(3'-amino-4'-ethoxy-benzylamino)-5-naphthol-7-sulfonic acid, 2-(3'-amino-4'-propoxy-5'-chloro-benzoylamino)-5-naphthol-7-sulfonic acid, 1-(3'-amino-5'-carboxy-phenyl)-5-pyrazolone-3-carboxylic acid, 1-(3'-amino-5'-sulfo-phenyl)-5-pyrazolone-3-carboxylic acid, 1-(3'-amino-4'-chloro-5'-ethyl-phenyl)-5-pyrazolone-3-carboxylic acid, 1-(3'-amino-5'-bromo-benzoylamino)-5-naphthol-7-sulfonic acid, 1-(4'-amino-3'-carboxy-phenyl)-3-methyl-5-pyrazolone, 2-(4'-methoxy-3'-amino-benzoylamino)-5-naphthol-7-sulfonic acid, 2-(4'-amino-benzoylamino)-5-naphthol-7-sulfonic acid, and 2-[4'-methoxy-3'-(4''-amino-benzoylamino)-benzoylamino]-5-naphthol-7-sulfonic acid.

As illustrations of other variations of the end components are mentioned:

5-methyl-1,3-dihydroxy-benzene,
3,5-dihydroxy-benzene-1-carboxylic acid,
3,5-dihydroxy-benzene-1-sulfonic acid,
1,3,5-tri-hydroxy-benzene,
1-methoxy-3,5-dihydroxy-benzene,
1-propoxy-3,5-dihydroxy benzene, and
1-hexyl-3,5-dihydroxy benzene.

From the foregoing disclosure it will be recognized that the invention is susceptible of modification without departing from the spirit and scope thereof and it is to be understood that the invention is not restricted to the specific illustrations thereof herein set forth.

We claim:

1. An azo compound of the group consisting of the acids and the alkali metal salts thereof which in the acid form are represented by the formula in which Q is one of a group consisting of branched and straight chain aliphatic hydrocarbon radicals having 1 to 6 carbons; each R is from the group consisting of hydrogen, alkyl having 1 to 6 carbons, the corresponding alkoxy groups, carboxy, sulfonic acid and halogen; R''''' is one of a group consisting of hydrogen, alkyl having 1 to 6 carbons, the corresponding alkoxy groups, hydroxy, sulfonic acid and carboxy; —HN—Aryl—$NH_2$ is one of a group consisting of radicals of the benzene and naphthalene series represented by the formulae

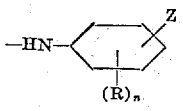

and

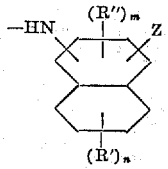

wherein R' is from the group consisting of hydrogen, halogen, carboxy and sulfonic acid; R'' is from the group consisting of hydrogen, halogen, alkyl having 1 to 6 carbons and the corresponding alkoxy groups; $n$ is 1 to 2; $m$ is 1 to 2; and Z is one of a group consisting of amino and the radical

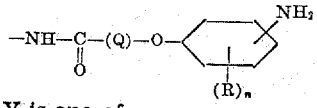

and each Y is one of a group represented by the following formulae

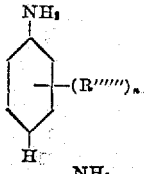

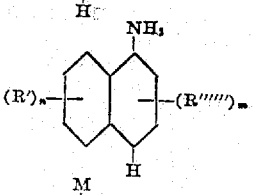

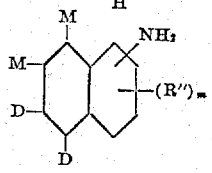

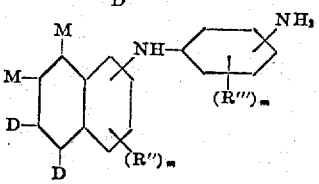

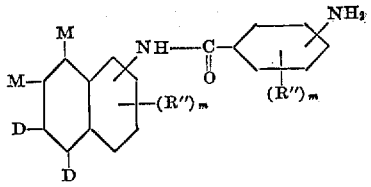

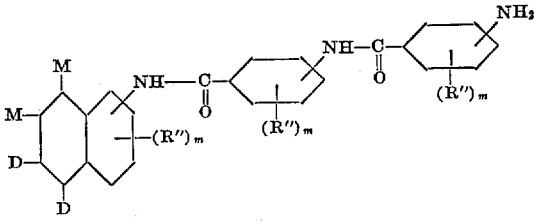

and

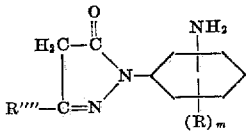

wherein —H represents the coupling position; one D is hydroxy and the other is hydrogen; the M which is meta to hydroxy is sulfonic acid and the other M is hydrogen; R''' is from the group consisting of hydrogen, carboxy, and sulfonic acid; R'''' is one of a group consisting of methyl and carboxy; and R'''''' is one of a group consisting of hydrogen, alkyl and alkoxy; said compound containing at least one solubilizing group.

2. An azo compound of the group consisting of the acids and the alkali metal salts thereof which in their acid form are represented by the formula

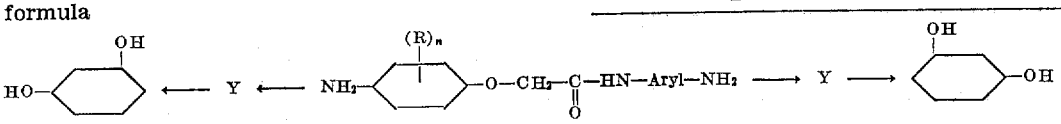

wherein —HN—Aryl—$NH_2$ is one of a group consisting of radicals of the benzene and naphthalene series represented by the formulae

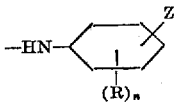

and

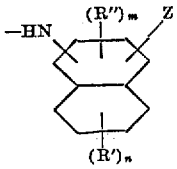

in which each R is one of a group consisting of hydrogen, lower alkyl and alkoxy, carboxy, sulfonic acid and halogen; R' is from the group consisting of hydrogen, halogen, carboxy and sulfonic acid; R'' is from the group consisting of hydrogen, halogen, lower alkyl and the corresponding alkoxy groups; $n$ is 1 to 2; $m$ is 1 to 2; and Z is one of a group consisting of amino and the radical

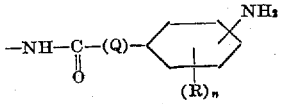

and each Y is one of a group represented by the following formulae

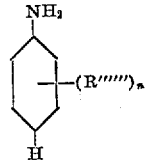

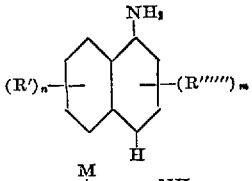

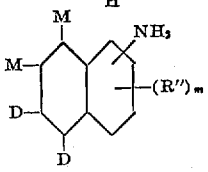

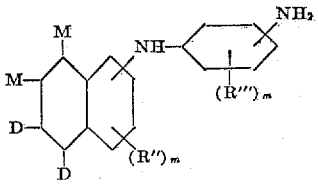

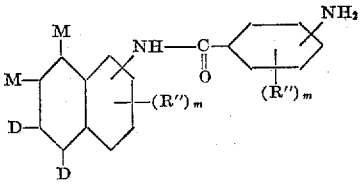

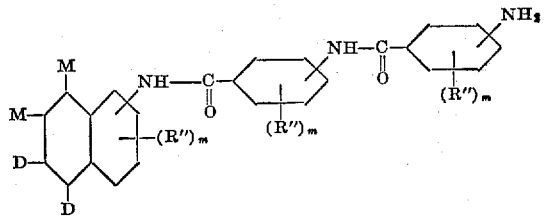

and

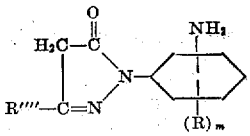

wherein —H represents the coupling position; one D is hydroxy and the other is hydrogen; the M which is meta to hydroxy is sulfonic acid and the other M is hydrogen; R''' is from the group consisting of hydrogen, carboxy, and sulfonic acid; R'''' is one of a group consisting of methyl and carboxy; and R'''''' is one of a group consisting of hydrogen, alkyl and alkoxy; said compound containing at least one solubilizing group.

3. An azo compound of the group consisting of the acids and the alkali metal salts thereof which in their acid form are represented by the formula

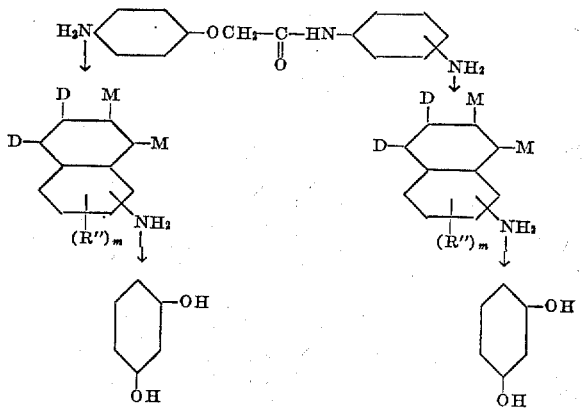

wherein R'' is from a group consisting of hydrogen, halogen, alkyl having 1 to 6 carbons, the corresponding alkoxy groups and halogen; $m$ is 1 to 2; one D is hydroxy and the other is hydrogen; the M which is meta to hydroxy is sulfonic acid and the other is hydrogen.

4. The compound represented by the formula

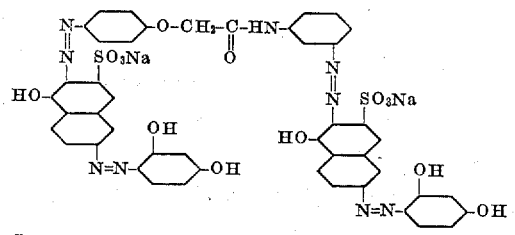

5. The compound represented by the formula

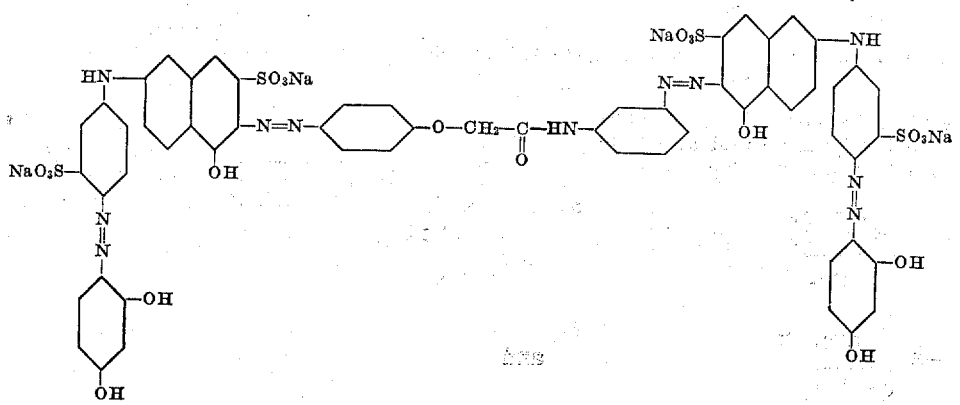

6. The compound represented by the formula

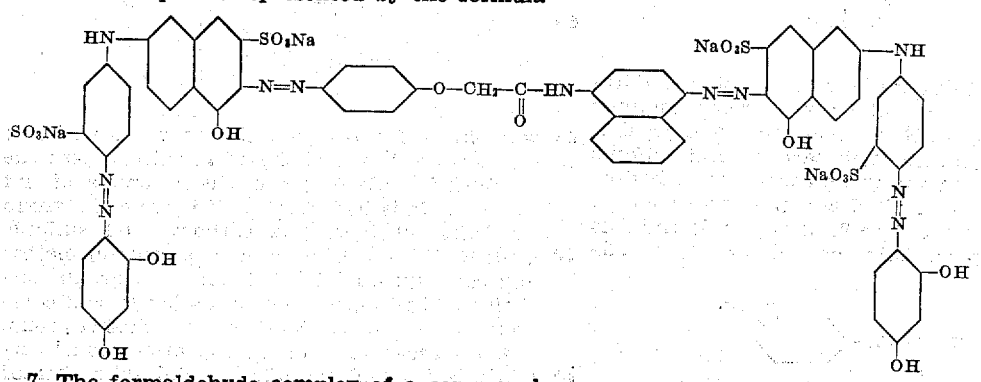

7. The formaldehyde complex of a compound of claim 1.

8. The formaldehyde complex of a compound of claim 2.

9. The formaldehyde complex of a compound of claim 3.

10. The formaldehyde complex of a compound of claim 4.

11. The formaldehyde complex of a compound of claim 5.

12. The formaldehyde complex of a compound of claim 6.

13. The formaldehyde and metal complex of a compound of claim 1.

14. The formaldehyde and metal complex of a compound of claim 2.

15. The formaldehyde and metal complex of a compound of claim 4.

16. The formaldehyde and metal complex of a compound of claim 5.

17. The formaldehyde and metal complex of a compound of claim 6.

CHILES E. SPARKS.
JAMES W. LIBBY, JR.